United States Patent

Haefner

[15] 3,669,210
[45] June 13, 1972

[54] AUTOMOTIVE SAFETY DEVICE

[72] Inventor: Fred F. Haefner, R.D. #2, Evans City, Pa. 16033

[22] Filed: Nov. 18, 1970

[21] Appl. No.: 90,718

[52] U.S. Cl..............................180/103, 180/114, 188/110, 188/265, 303/89
[51] Int. Cl.........................................................B60r 25/08
[58] Field of Search.....................180/103, 114, 82; 188/110, 188/111, 265; 303/31, 89

[56] References Cited

UNITED STATES PATENTS 2,789,667   4/1957   Tannenbaunch......................188/110

Primary Examiner—Benjamin Hersh
Assistant Examiner—John P. Silverstrim
Attorney—Buell, Blenko & Ziesenheim

[57] ABSTRACT

In an automotive vehicle having a brake mechanism and a key actuated switching-ignition mechanism to start a power plant, an automotive safety device having a first engaging means for engaging said brake mechanism when said switching-ignition mechanism is deactivated and maintaining said brake mechanism engaged while said switching-ignition mechanism is off, a releasing means for releasing said first engaging means and for maintaining said first engaging means disengaged while said switching-ignition mechanism is on, an actuating means for actuating said releasing means when said key actuates said switching-ignition mechanism and connected to said releasing means by electrical lead means, a vacuum chamber enclosing said electrical lead means and extending from adjacent said actuating means to adjacent said releasing means, and a second engaging means for engaging said brake mechanism when a given vacuum in said vacuum chamber is released and for maintaining said brake mechanism engaged until said given vacuum is restored within said vacuum chamber.

8 Claims, 3 Drawing Figures

PATENTED JUN 13 1972  3,669,210
INVENTOR
Fred F. Haefner
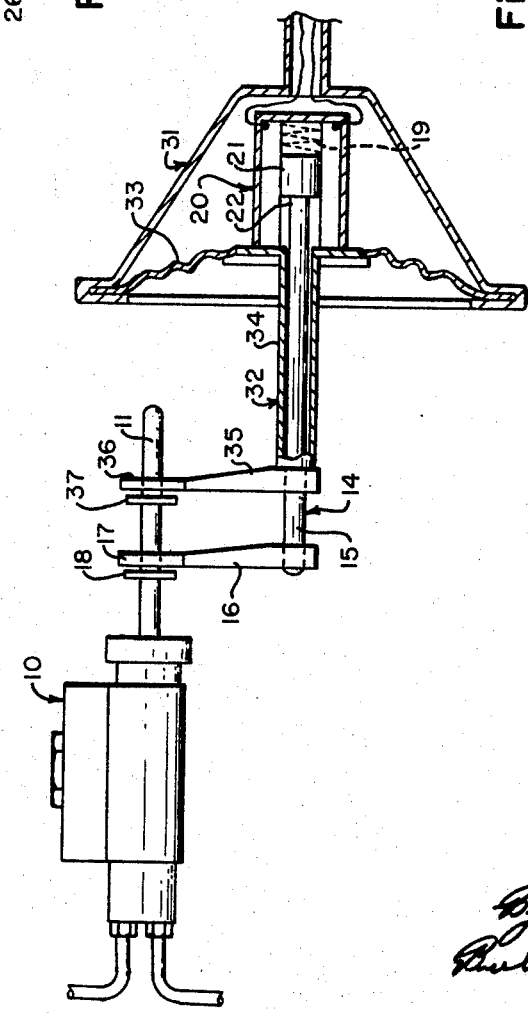

AUTOMOTIVE SAFETY DEVICE

This invention relates to a safety/device for protecting automobiles and the like against theft. It is particularly useful in providing a foolproof and inexpensive means of stopping the theft of automobiles and the like in the usual ways or by readily disconnecting the safety device.

Safety apparatus to prevent the theft of automobiles and the like is broadly old and well-known in the art. It has taken on various forms. Generally it involves the setting of the brake mechanism of the automobile in some way. But each of these apparatus has not prevented all usual ways of automobile theft, or theft by readily disconnecting the safety apparatus.

One such form of safety apparatus is to have a solenoid and armature to engage the brake mechanism of the automobile and prevent its release when the automobile is started without the proper ignition key or by by-passing the switching-ignition mechanism. Such an apparatus is disclosed in Pefine U.S. Pat. No. 3,470,974. Such an apparatus would not prevent the theft of the automobile by simply rolling the automobile away without starting the power plant, or by easily disconnecting the apparatus before the automobile is started.

Another such form of safety apparatus is a vacuum system operated by the power plant to release (or engage) the braking mechanism. Such apparatus either (i) maintains the breaking mechanism engaged when the automobile is not operating and automatically releases it when the power plant is started, or (ii) engages the breaking mechanism only when the apparatus is actuated and the power plant is started. Such apparatus is disclosed in Lustich U.S. Pat. No. 1,967,151, Stortz U.S. Pat. No. 3,463,262 and Folberth U.S. Pat. No. 1,966,621. But such apparatus either did not stop theft by simply by-passing the switching-ignition mechanism to start the power plant, or by rolling the automobile away without starting the power plant or disconnecting the safety apparatus before the power plant is started.

The present invention overcomes these disadvantages and difficulties. It is an inexpensive and mechanically simple means for preventing the theft of an automobile and the like by by-passing or breaking the switching-ignition mechanism to start the power plant, by simply rolling the automobile away without starting the power plant, or by readily disconnecting the safety apparatus before the power plant is started.

In an automotive vehicle having a brake mechanism and a key actuated switching-ignition mechanism to start a power plant, I provide the improvement of an automotive safety device to prevent theft of the automotive vehicle in any of the usual ways or by readily disconnecting the said safety device. A first engaging means engages the brake mechanism when the switching-ignition mechanism is deactivated and maintains the brake mechanism engaged while said switching-ignition mechanism is off. A releasing means releases said first engaging means and maintains said first engaging means disengaged while the switching-ignition mechanism is on. An actuating means actuates said releasing means when the ignition key actuates the switching-ignition mechanism and is connected to said releasing means by electrical lead means. A vacuum chamber encloses said electrical lead means and extends from adjacent said actuating means to adjacent said releasing means. A second engaging means engages the brake mechanism when a given vacuum in said given vacuum chamber is released and maintains said brake mechanism engaged until said given vacuum is restored within said vacuum chamber.

The actuating means for actuating said releasing means when said key actuates the switching-ignition mechanism may be of any suitable and convenient form. I prefer that the actuating means be positioned adjacent the switching-ignition mechanism so that it can be actuated by a portion of the ignition key when the ignition key is inserted into the switching-ignition mechanism and rotated.

The given vacuum in the vacuum chamber can be established and maintained in any suitable and convenient way. It can for example be created and maintained by connection to the exhaust system of the power plant; such means is sufficient because the given vacuum need only be maintained within the vacuum chamber when the power plant is operated to operate the safety device. I prefer however that the vacuum be created and sealed within the vacuum chamber during manufacturing of the safety device prior to its installation in the automotive vehicle; this arrangement makes the safety device self-sustaining and eliminates the need for additional expensive and time-consuming connection during installation.

Other details, objects and advantages of my invention will become apparent as the following description of the presently preferred embodiment thereof proceeds.

In the accompanying drawings I illustrate a presently preferred embodiment of my invention in which:

FIG. 1 is an exploded schematic view showing an automotive safety device for preventing the theft of automobiles and the like;

FIG. 2 is a view taken along line II—II of FIG. 1; and

FIG. 3 is a view taken along line III—III of FIG. 1.

Referring specifically to the drawings, an automotive vehicle has hydraulic brake mechanism 10 which is actuated by movement of piston rod 11 through linkage to a brake pedal (not shown) and switching-ignition mechanism 12 which is actuated by asserting and rotating ignition key 13 to start a power plant (not shown).

A first engaging means 14 is provided for engaging brake mechanism 10 when switching-ignition mechanism 12 is deactivated and maintaining said brake mechanism 10 engaged while switching-ignition mechanism 12 is off. First engaging means 14 as shown has spring 19, rod 15 and arm 16, arm 16 having an end portion 17. End portion 17 extends round piston rod 11 of brake mechanism 10 adjacent a ring 18 that is fixed rigidly to piston rod 11. First engaging means 14 causes brake mechanism 10 to engage by having spring 19 forcing against end portions 22 of rod 15 and in turn end portion 17 of arm 16 forcing against ring 18 possibly through mechanical leverages, if needed.

A releasing means 20 is provided for releasing first engaging means 14 and for maintaining first engaging means 14 disengaged while switching-ignition mechanism 12 is activated. Releasing means 14 has a solenoid 21 with end portions 22 of rod 15 at its core. Releasing means 20 operates to release and to maintain released first engaging means 14 and in turn brake mechanism 10 by movement of rod 15 by electromagnetic forces against spring 19.

Actuating means 23 is provided for actuating releasing means 20 when ignition key 13 is inserted to actuate the switching-ignition mechanism 12 and is connected to releasing means 20 by electric lead means 24. Actuating means 23 as shown has positive and negative contacts 25 and 26, respectively, and contacts 27 to which electrical lead means 24 are connected. Actuating means 23 also has a rotatable wiper 28 with a slot 29 at its center portions. Slot 29 is adapted to receive end portions 30 of ignition key 13. The entire assembly of actuating means 23 is positioned adjacent switching-ignition mechanism 12 so that when ignition key 13 is inserted into switching-ignition mechanism 12 end portions 30 engage slot 29, and when ignition key 13 is rotated to start the power plant, the wiper 28 is also rotated to close the circuit between positive contact 25 and one of the contacts 27 and between negative contact 26 and the other of the contacts 27, in turn supplying power to releasing means 20 through electrical lead means 24 to release the brake mechanism 10.

A vacuum chamber 31 encloses electrical lead 24 and solenoid 21 and extends from adjacent the actuating means 23 to adjacent releasing means 20. A given vacuum is created during manufacturing of the safety apparatus and maintained in vacuum chamber 31 if and until it is ruptured.

A second engaging means 32 is provided for engaging the brake mechanism 10 when a given vacuum in the vacuum chamber 31 is released and for maintaining brake mechanism 10 engaged until said given vacuum is restored within vacuum chamber 31. Second engaging means 32 as shown has a resilient diaphragm 33 forming a wall of vacuum chamber 31, rod 34 concentrically positioned about rod 15, and arm 35 having end portions 36 positioned around piston arm 11. In this way, the given vacuum chamber 31 directly maintains second engaging means 32. End portions 36 are adjacent ring 37 that is rigidly fixed to piston rod 11. By this arrangement, the second engaging means actuates the brake mechanism 10 when the given vacuum in vacuum chamber 31 is released by rupturing vacuum chamber 31; the rupture causes the resilient diaphragm 33 to move rod 34 and arm 35 and in turn forcing end portions 36 against ring 37 possibly through mechanical leverage, if needed, to engage brake mechanism 10.

In operation, the safety device provides against the theft of automotive vehicles in all of the usual ways: (i) the automotive vehicle cannot be rolled away without activating the switching-ignition mechanism 12 because the brake mechanism is engaged by first engaging means 14 while the switching-ignition mechanism 12 is off; (ii) the automotive vehicle cannot be stolen by electrically by-passing the switching-ignition mechanism 12 to start the power plant because actuating means 23 and releasing means 20 will also be by-passed; (iii) the power plant cannot be started by simply inserting an instrument such as a screwdriver into the switching-ignition mechanism 12 and forcing it to turn the switching-ignition mechanism 12 to start the power plant because the switching-ignition mechanism 12 can turn independent of wiper 28, and thereby passing-by actuating means 23 and releasing means 20; and (iv) the safety device cannot be readily disconnected to by-passing actuating means 23 to power releasing means 20 because vacuum chamber 31 would necessarily have to be ruptured which would cause the brake mechanism 10 to be engaged by second engaging means 32.

The safety device could be circumvent only by breaking first engaging means 14, such as sawing through arm 16. This could not be easily done under the circumstances in which an auto theft usually takes place. However to further discourage auto theft the first engaging means 14 may be placed in an enclosure that could not be easily broken into.

While I have shown and described a certain presently preferred embodiment of my invention, it is to be distinctly understood that the invention is not limited thereto but that it may be otherwise variously embodied.

I claim:

1. In an automotive vehicle having a brake mechanism and a key actuated switching-ignition mechanism to start a power plant, and automotive safety device comprising: a first engaging means for engaging said brake mechanism when said switching-ignition mechanism is deactivated and maintaining said brake mechanism engaged while said switching-ignition mechanism is deactivated; a releasing means for releasing said first engaging means and for maintaining said first engaging means disengaged while said switching-ignition mechanism is activated; an actuating means for actuating said releasing means when said key actuates said switching-ignition mechanism and connected to said releasing means by electrical lead means; a vacuum chamber enclosing said electrical lead means and extending from adjacent said actuating means to adjacent said releasing means; and a second engaging means for engaging said brake mechanism when a given vacuum in said vacuum chamber is released and for maintaining said brake mechanism engaged until said given vacuum is restored within said vacuum chamber.

2. In an automotive vehicle having a brake mechanism and a key actuated switching-ignition mechanism to start a power plant, an automotive safety device as claimed in claim 1 wherein said vacuum chamber at least partially encloses said releasing means.

3. In an automotive vehicle having a brake mechanism and a key actuated switching-ignition mechanism to start a power plant, an automotive safety device as claimed in claim 1 wherein said releasing means comprising a solenoid means.

4. In an automotive vehicle having a brake mechanism and a key actuated switching-ignition mechanism to start a power plant, an automotive device as claimed in claim 3 within said vacuum chamber encloses said solenoid means.

5. In an automotive vehicle having a brake mechanism and a key actuated switching-ignition mechanism to start a power plant, an automotive safety device as claimed in claim 1 wherein said given vacuum in said vacuum chamber directly maintains said second disengaging means.

6. In an automotive vehicle having a brake mechanism and a key actuated switching-ignition mechanism to start a power plant, an automotive safety device as claimed in claim 1 wherein said actuating means is adjacent said switching-ignition mechanism and is actuated by a portion of said key.

7. In an automotive vehicle having a brake mechanism and a key actuated switching-ignition mechanism to start a power plant, an automotive safety device as claimed in claim 1 wherein said given vacuum is created and sealed into said vacuum chamber during manufacture prior to installation.

8. In an automotive vehicle having a brake mechanism and a key actuated switching-ignition mechanism to start a power plant, an automotive safety device as claimed in claim 1 wherein said given vacuum can be maintained in said vacuum chamber by operation of said power plant.

* * * * *